March 8, 1927.  
W. G. KIRCHHOFF  
DOUGH MOLDER  
Filed Feb. 21, 1922  
1,620,559  
4 Sheets-Sheet 1

Inventor  
WILLIAM G. KIRCHHOFF

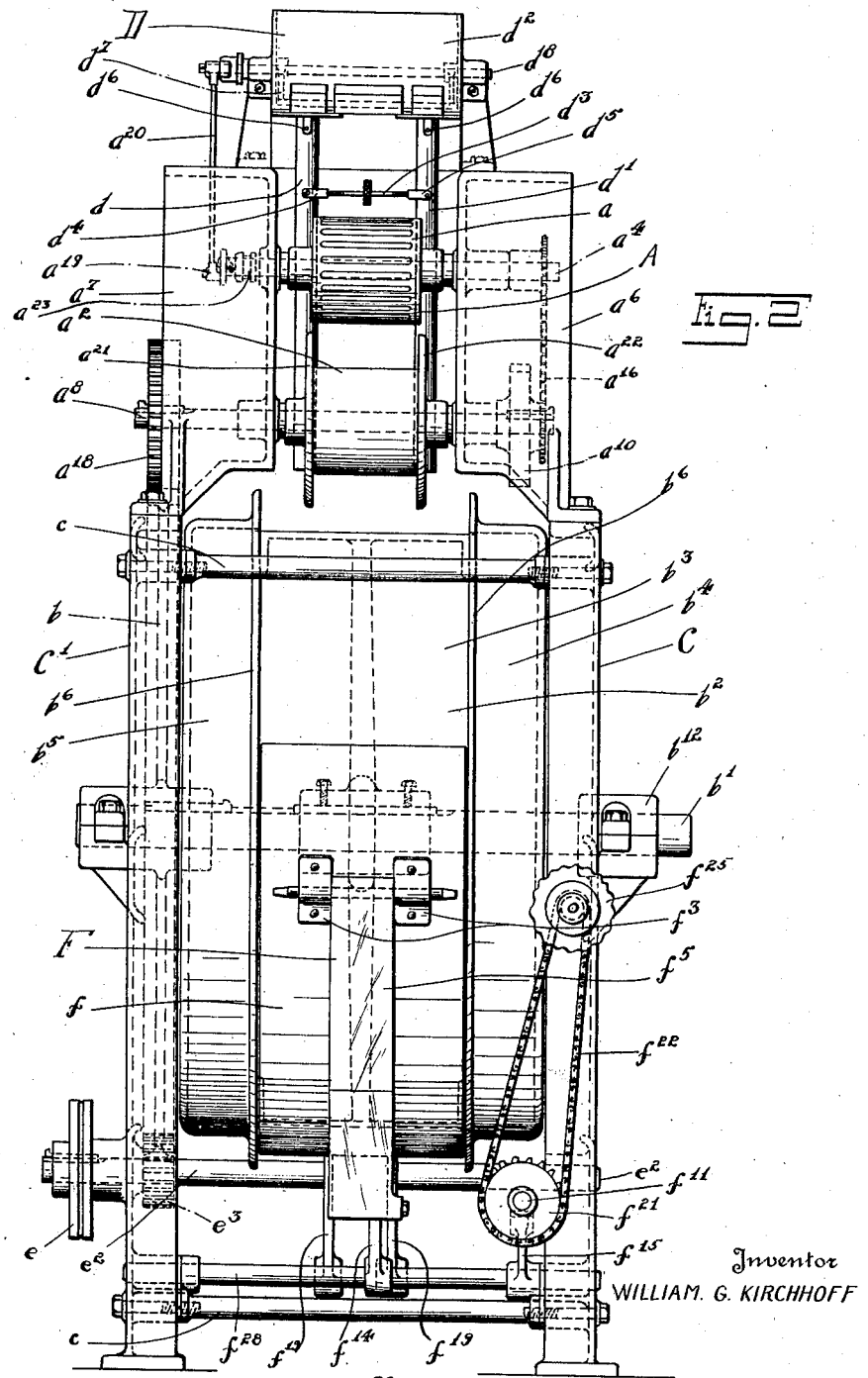

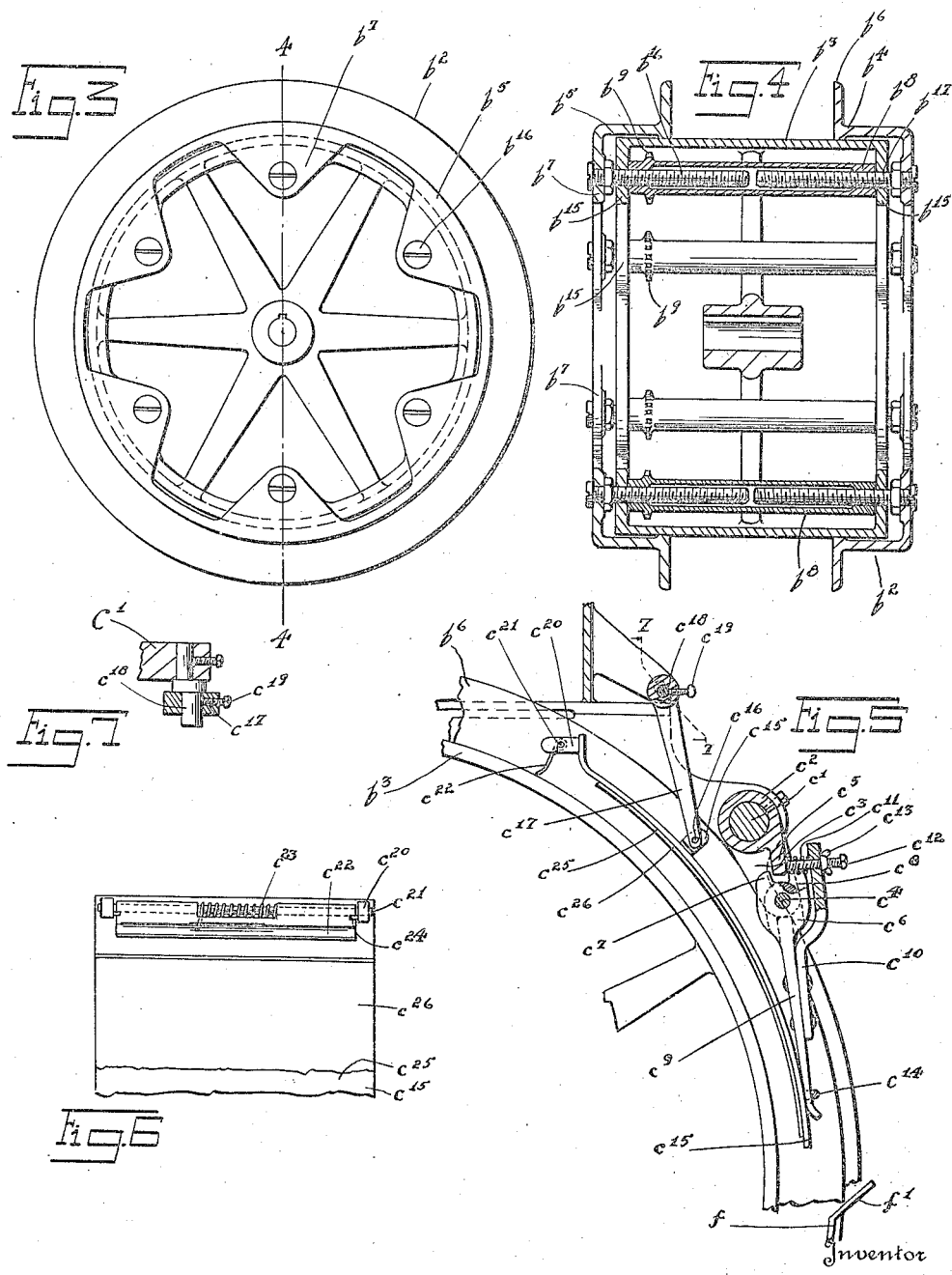

Patented Mar. 8, 1927.

1,620,559

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

DOUGH MOLDER.

Application filed February 21, 1922. Serial No. 538,308.

My invention relates to certain improvements in machines for molding dough into loaves.

An object of my invention is to provide a device of this type, adapted to be employed to mold loaves of various sizes.

Another object is to provide a molder of this type, wherein the means whereby the device is adjusted to accommodate loaves of various sizes, are simple in construction, adjustment and replacement.

Another object is to provide a device for the purposes stated, that is simple and efficient in operation.

These and other objects are attained by the means described herein and disclosed in the accompanying drawings, in which:

Fig. 2 is an enlarged side elevation of the device shown in Fig. 1.

Fig. 3 is a front elevation of a drum forming a detail of my invention.

Fig. 4 is a sectional view on line 4—4 of Fig. 3.

Fig. 5 is an enlarged fragmental view partly in section, of parts forming details of my invention.

Fig. 7 is an enlarged sectional view on line 7—7 of Fig. 5.

Fig. 8 is a side elevational view of Fig. 5.

Figure 1:
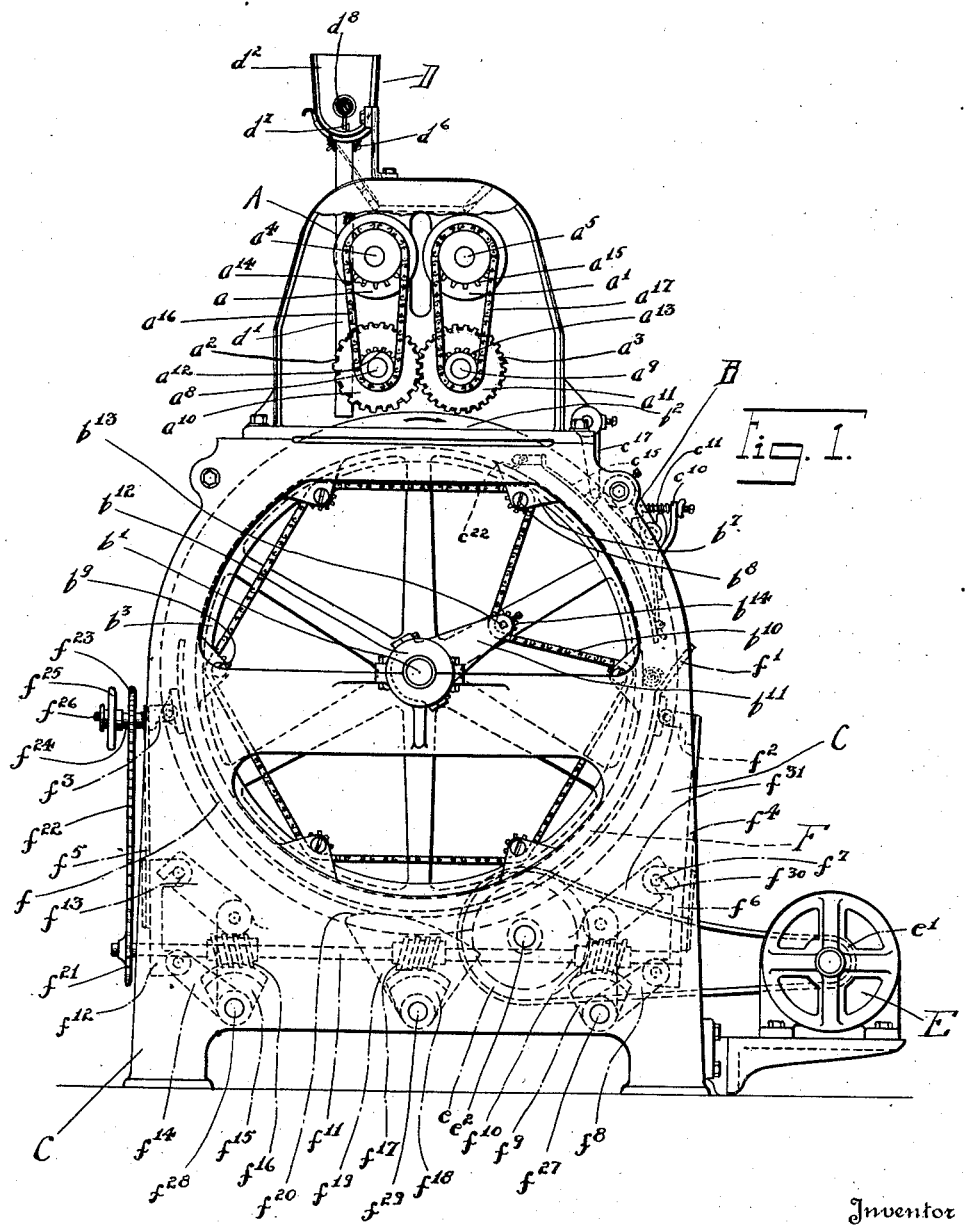
Fig. 1 is a front elevation of a molder embodying my invention.
Figure 6:
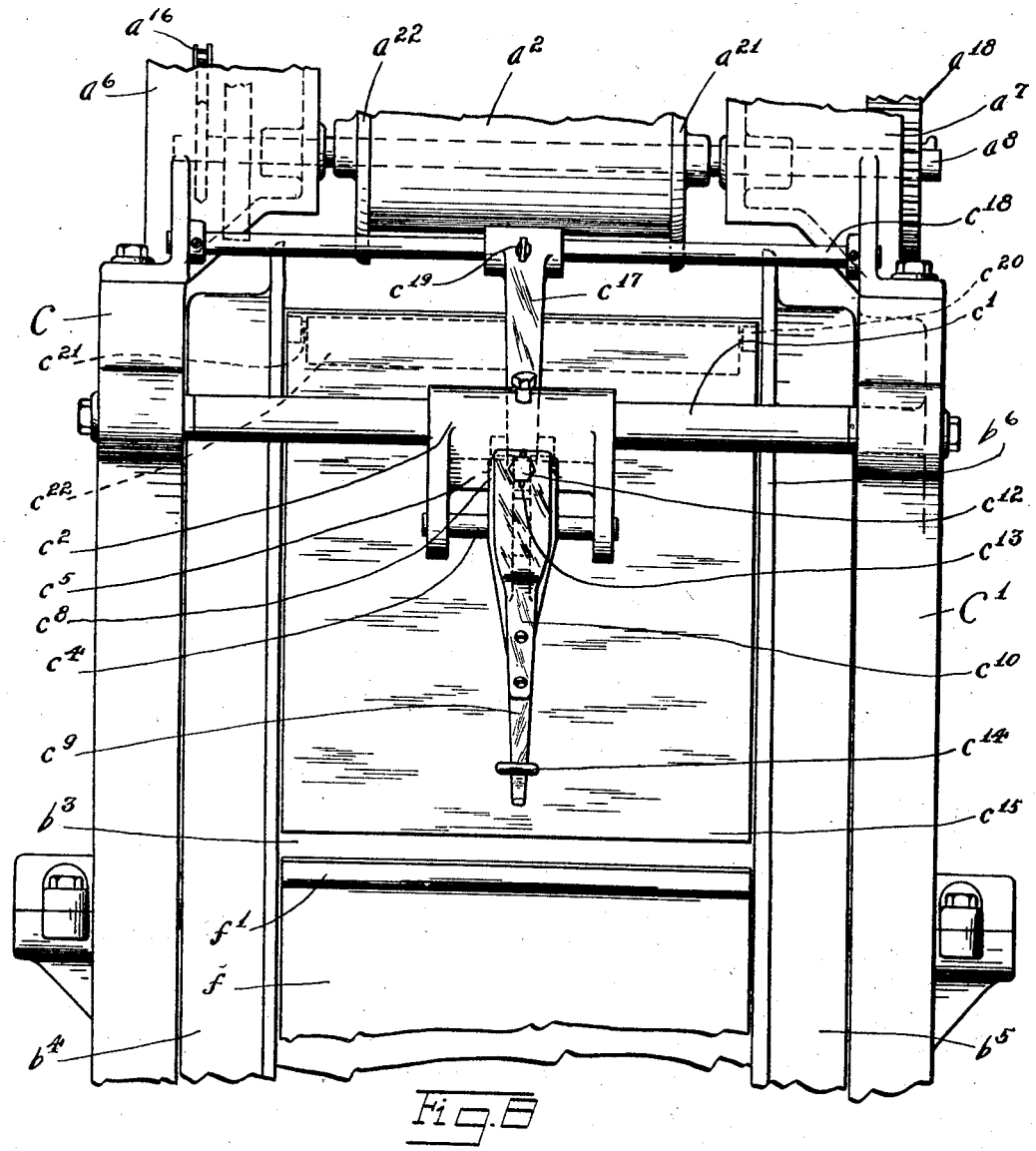
Fig. 6 is an enlarged fragmental view of a curling board forming a detail of my invention.

My invention comprises a revolving drum $b^2$ partly about which extends a curling board $c^{15}$ and a binding board $f$, which boards cooperate with the drum and with one another in molding the dough as it is carried thru the molder. The molder comprises a band rolling mechanism A, adapted to roll batches of dough into sheets or bands, a loaf rolling or carrying mechanism B, a flouring device D, and suitable driving means E.

The device embraces a frame comprising sides C and $C^1$ secured in spaced relation upon one another by means of suitable cross bars $c$, and this frame supports the various other parts of the molder.

The band rolling mechanism comprises pairs of rolls $a$, $a^1$, and $a^2$, $a^3$, adapted to roll batches of dough into ribbons or bands. The upper pair of rolls $a$ and $a^1$, are mounted on shafts $a^4$ and $a^5$ respectively, which shafts are supported at their opposite ends upon the plates $a^6$ and $a^7$ mounted upon the sides C and $C^1$, respectively. The lower pair of rolls $a^2$ and $a^3$ are mounted on shafts $a^8$ and $a^9$ respectively, which shafts are supported at their opposite ends upon the plates $a^6$ and $a^7$. The shafts $a^8$ and $a^9$ carry intermeshing gears $a^{10}$ and $a^{11}$ and sprockets $a^{12}$ and $a^{13}$. Shafts $a^4$ and $a^5$ carry sprockets $a^{14}$ and $a^{15}$. A chain $a^{16}$ extends about sprockets $a^{12}$ and $a^{14}$, and a chain $a^{17}$ extends about sprockets $a^{13}$ and $a^{15}$. The shaft $a^8$ carries a gear $a^{18}$ which meshes with a gear $b$ carried by the shaft $b^1$ supporting the drum $b^2$. The shaft $a^4$ carries an eccentric $a^{19}$ to which is connected a rock shaft $a^{20}$. A clutch $a^{23}$ controls transmission of power from shaft $a^4$ to the eccentric $a^{19}$, the clutch being of any type or structure adapted to accomplish this object. The upper rolls $a$ and $a^1$ are spaced from one another at a greater distance than are the rolls $a^2$ and $a^3$ spaced from one another.

The roll $a^2$ is provided with flanges $a^{21}$ and $a^{22}$ which are adapted to preclude escape of dough at the ends of said rolls. The flouring device D is adapted to discharge flour dust upon the pairs of rolls thereby precluding sticking of the dough to the rolls. The shaft $b^1$ which acts as the axis of the drum $b^2$ is in substantially vertical alignment with the bands or ribbons of dough as such ribbons leave the lowermost pair of rolls. Pipes $d$ and $d^1$ extend from the bin $d^2$ of the flouring device and serve to guide flour to the drum $b^2$ in order that a film of flour may be deposited upon said drum, thereby precluding sticking of the dough to the drum. A bar $d^3$ having its opposite ends threaded in opposite directions carries upon such opposite ends, yokes $d^4$ and $d^5$ and the branches of the yoke are pivotally mounted upon the pipes $d$ and $d^1$. The ends of the bar may be threaded into said yokes whereby the pipes may be moved about their pivotal mountings $d^6$ upon the bottom of the bin $d^2$, thereby effecting convergence and divergence of the lower ends of said pipes, such lower ends being disposed immediately over the drum $b^2$. The bores of the pipes communicate with the interior of the bin $d^2$. The bin contains a paddle $d^7$ mounted on shaft $d^8$, and the shaft is oscillated by the eccentric $a^{19}$ and rock shaft $a^{20}$.

The drum $b^2$ comprises a cylindrical center portion or body $b^3$ which is fixed upon the shaft $b^1$ and adapted to revolve therewith. The cylindrical ends or caps $b^4$ and $b^5$ are adapted to telescope over the central portion $b^3$ and each of said sides has formed upon it a flange $b^6$ which extends radially outward from the central portion, said flanges forming walls which may be adjusted toward or away from one another in order to provide exposure of various widths of the center portion $b^3$ of the drum. The sides are mounted in the following manner: Lugs $b^7$ formed on the sides and lugs $b^{15}$ formed on the center portion $b^3$ extend radially centerward, and are disposed in sets about the circumference of the drum. Each set comprises a pair of lugs $b^7$, one each of which is mounted on one side of the ends $b^4$ and $b^5$, and a second pair of lugs $b^{15}$ on opposite sides of the center portion $b^3$. Between each pair of lugs 15 extend sleeves $b^8$, and each sleeve carries a sprocket $b^9$. A sprocket chain $b^{10}$ extends about the sprockets $b^9$, whereby it is possible by revolubly actuating one sleeve $b^9$, to simultaneously adjust or actuate the other sleeves $b^8$. In order to facilitate the adjustment of the sleeves $b^8$, a lug $b^{11}$ is formed upon the hub $b^{12}$ of the drum, and carries a shaft $b^{13}$ carrying a sprocket $b^{14}$ about which the chain $b^{10}$ extends. This shaft $b^{13}$ is provided with a square head whereby the shaft may be revolubly actuated by means of an ordinary socket wrench. The opposite ends of the sleeves are screw threaded internally and the screws $b^{16}$ mounted upon lugs $b^7$ extend into such threaded portion of the sleeve. The lugs $b^{15}$ are provided with suitable apertures $b^{17}$ through which the screws $b^{16}$ may extend. The threads formed at the opposite ends of any one sleeve extend in opposite directions and all the threads at a given side of the device extend in the same direction, wherefore, when the sleeves are revolubly actuated, the sides are either moved toward or away from one another.

The crossbar $c^1$, see Fig. 5, has pivotally mounted upon it a sleeve or hub $c^2$ from the opposite ends of which extend arms $c^3$ supporting between them a rock shaft $c^4$. A flange $c^5$ lying between arms $c^3$, extends toward the rock shaft $c^4$. A yoke $c^6$ is pivotally mounted upon the rock shaft $c^4$ and the branches $c^7$ and $c^8$ of said yoke are adapted to lie on opposite sides of the flange $c^5$. The stem $c^9$ extending from the yoke carries a bracket $c^{10}$ having a threaded bore in its upper end in which is mounted a pin or screw $c^{12}$, the outer end of which screw has an angular head, and the inner end of which is adapted to engage the flange $c^5$. A spring $c^{11}$ is mounted upon the screw and its opposite ends abut the flange $c^5$ and the bracket $c^{10}$. A wing nut $c^{13}$ is adjustably mounted upon the screw and serves as a lock nut. The lower end of the stem $c^9$ extends through a U shaped bracket $c^{14}$ mounted upon the curling board $c^{15}$. The lower or inner face $c^{25}$ of the curling board has mounted on it a canvas band or cover $c^{26}$. Upon the upper or outer face of the curling board is mounted a lug $c^{15}$ supporting a pivot $c^{16}$ which extends through the lower end of a bracket $c^{17}$ mounted on an eccentrically mounted shaft $c^{18}$ extending between the sides C and $C^1$ of the frame. The bracket $c^{17}$ may be rotated upon the shaft $c^{18}$ and may be secured in adjacent positions by means of a thumb screw or set screw $c^{19}$ which screw extends through the bracket and engages the shaft $c^{18}$. The shaft $c^{18}$ may be rotated in its bearings upon the sides C and $C^1$. The pivot $c^{16}$ forms a pivotal mounting of the curling board. The upper end of the curling board is turned outwardly and lugs $c^{20}$ extend from its opposite sides, said lugs being disposed upon the side of the curling board carrying the canvas band. A non-rotating rod $c^{21}$ extends between the lugs and has pivotally mounted upon it a flapper $c^{22}$ the lower end of which lies immediately above the surface of the inner portion of the drum. A spring $c^{23}$ mounted upon the rod $c^{21}$ has one end fixed upon the flapper whereby the flapper is yieldingly retained in the stated position. Pins $c^{24}$ extending from the lugs $c^{20}$, limit the movement of the flapper under the influence of the spring $c^{23}$. The spring $c^{23}$, is so tensioned that as a sheet of dough is carried by the drum toward the curling board and engages the flapper $c^{22}$, the flapper will serve to turn the edge of the sheet of dough back upon itself. After having turned this edge of the dough, the further movement of the drum and the dough, causes the flapper to yieldingly move toward the canvas faced portion of the curling board, permitting the dough to pass by the flapper, whereupon the roll of dough which has been developed, engages the curling board.

The loaf binding mechanism F, through which the loaf passes after it leaves the curling board, comprises a curved plate $f$ having a curvature concentric to that of the drum, and under-lies substantially the lower half of the drum. The forward end $f^1$ of the plate $f$, or in other words, that end of the plate $f$ adjacent the curling board extends outwardly so as to form a guide-way adapted to preclude the escape of a loaf of dough from the device as such loaf passes from the curling board to the plate $f$. The opposite ends of the plate $f$ are pivotally mounted, by means of brackets $f^2$ and $f^3$ upon arms $f^4$ and $f^5$ respectively. The arm $f^4$ is mounted upon a block $f^6$ the upper end of which carries a pin $f^7$ which pin engages in the slot $f^{30}$ in the arm $f^{31}$ carried by the frame of the device. The other end of the block is pivotally connected by means of a link $f^8$ with the hub of a worm wheel segment $f^9$ mounted on shaft $f^{27}$, and which segment engages a worm $f^{10}$ mounted on the shaft $f^{11}$ mounted upon the frame of the device. In the same way the arm $f^5$ is mounted upon a block $f^{12}$ one end of which makes a pivotal connection upon an arm $f^{13}$ and the other end of which is pivotally connected by means of a link $f^{14}$ with the hub of a worm wheel segment $f^{15}$ mounted on shaft $f^{28}$ and which segment engages a worm $f^{16}$ mounted on the shaft $f^{11}$. A third worm $f^{17}$ is engaged by a worm wheel segment $f^{18}$ mounted on a shaft $f^{29}$ and which segment carries a cam $f^{19}$ the cam surface $f^{20}$ of which engages the plate $f$ intermediate its ends, or at substantially its lowermost portion. The shaft $f^{11}$ carries a sprocket $f^{21}$ about which extends a chain $f^{22}$, which chain also extends about a sprocket $f^{23}$ mounted on the sleeve $f^{24}$ carried by the hand wheel $f^{25}$, which is revolubly mounted upon the stud shaft $f^{26}$ extending from the frame of the device. The driving mechanism E comprises a pulley $e^1$ the pulley $e$ being mounted on a shaft $e^2$ carrying a gear $e^3$, which in turn engages the gear $b$ carried by the shaft $b^1$ supporting the drum $b^2$.

The operation of my device is as follows: Batches of dough are deposited between the uppermost pair of rolls and are formed into a ribbon or band as it passes there-between to the lower-most pair or rolls. The lowermost pair of rolls reduce the thickness of the band. From the lowermost pair or rolls the band passes to the drum, which drum revolves in a clockwise direction, see Fig. 1. The flouring device D serves to cover the rolls and drum with a film of flour suitable to preclude sticking of the dough to the rolls and drum. When the forward end of the band of dough engages the flapper $c^{22}$, the yielding resistance of the flapper causes the foremost end of the band of dough to be turned over upon itself in a direction away from the drum and to be bent or turned backwardly upon the band. Further movement of the drum causes the dough to push the flapper back whereupon the dough passes the flapper and engages the canvas covered face of the curling board. The initial turn or roll imparted to the band of dough causes further movement of the drum and dough to continue the rolling of the dough until the band has been developed into a roll. The canvas covered face of the curling board precludes slippage of the roll as it is being formed. The pivotal mounting of the curling board and the yielding resistance of the spring $c^{11}$ permit the lower end of the curling board to be moved away from the drum as the roll of dough increases in diameter. After the roll of dough leaves the curling board it passes between the curved plate $f$ and the drum, and as the roll of dough passes therebetween, the repeated rotation of the dough while under the pressure exerted upon it, due to the position of the plate $f^1$ and the drum, causes the several spirals of dough to be knit one upon the other so that at the time the dough is discharged from between the plate $f^2$ and the drum, the loaf of dough is moulded and bound or sealed in such way that it will not come apart, and is then ready for proofing. The sides of the drum may be adjusted toward and away from one another by rotating the shaft $b^{13}$, in order to accommodate various sized loaves. The curling board may be adjusted toward and away from the drum by means of the arm $c^{17}$, in order to vary the distance between such parts. The adjustment device comprising the screw $c^{12}$, wing nut $c^{13}$, and spring $c^{11}$ permit variation of the pressure exerted upon the dough when being curled. By revolubly actuating the shaft $f^{11}$ the curved plate $f$ may be moved toward and away from the drum thereby varying the pressure exerted upon a roll of dough when passing between the plate $f$ and the drum.

What I claim is:

1. In a dough molder, the combination with a drum of end caps telescopically adjustable over the ends of the drum, and rotatable means comprising sprockets and a chain for effecting said telescopic adjustment of the end caps.

2. In a dough molder, the combination with a drum of a fabric faced curling board.

3. In a dough molder, the combination with a drum of a curling board, means to pivotally mount the board adjacent the drum and normally concentric thereto, and means yieldingly resisting movement of the board about its pivotal mounting.

4. In a dough molder the combination of a drum adapted to carry a band of dough, a curling board having a yieldable pivotal mounting and adapted with the drum to develop the band into a roll and a flapper adapted to turn the end of a band of dough upon itself whereby the initial turn of the band upon itself is accomplished before the band engages the curling board.

5. In a dough molder the combination of a drum adapted to carry a band of dough, an arcuate curling board adapted with the drum to develop the band into a roll, a flapper pivotally mounted on the curling board adapted to turn the end of a band of dough upon itself, and means yieldingly retaining the flapper in engagement upon the band of dough.

6. In a dough molder the combination of a drum adapted to carry a band of dough, a curling board adapted with the drum to develop the band into a roll, a flapper pivotally mounted on the curling board adapted to turn the end of a band of dough upon itself, means pivotally mounting the curling board in cooperative relationship to the drum, means yieldingly resisting bodily movement of the curling board upon its pivotal mounting, and means yieldingly retaining the flapper in engagement upon the band of dough.

7. In a dough molder the combination of a drum, end caps telescopically adjustable over the ends of the drum, rotatable means for effecting said adjustment, whereby various portions of the surface of the drum may be exposed and adjustable means to deposit a film of flour over the exposed surface of the drum.

8. A drum of the class described comprising a cylindrical body, a cylindrical end cap extending over the end of the body, adapted to be reciprocated axially of the body, and rotatable means comprising a series of threaded rods carrying sprockets and an endless chain passing about said sprockets to reciprocate the end cap.

9. A drum of the class described comprising a cylindrical body, cylindrical end caps extending over the ends of the body, radial flanges on the caps extending outwardly from the periphery of the body whereby a way is formed between the periphery of the drum and the flanges, and rotatable means to reciprocate the end caps longitudinally of the axis of the body whereby the width of the way between the flanges and the periphery of the body may be varied.

10. A drum of the class described comprising a cylindrical body, slotted lugs disposed in pairs on the ends of the body extending radially centerward of the body, end caps extending over the ends of the body and slidable over the peripheral surface of the body, flanges on the caps extending radially outward from the opposed ends of the caps, screw bars mounted on the caps disposed in substantial parallelism with the axis of the drum and extending reciprocally thru the slots in the lugs, threaded sleeves between the pairs of lugs and engaging the screw bars, and means to revolubly actuate the sleeves, whereby the caps may be reciprocated over the body.

11. A drum of the class described comprising a cylindrical body, slotted lugs disposed in pairs on the ends of the body extending radially centerward of the body, end caps extending over the ends of the body and slidable over the peripheral surface of the body, flanges on the caps extending radially outward from the opposed ends of the caps, screw bars mounted on the caps disposed in substantial parallelism with the axis of the drum and extending reciprocally thru the slots in the lugs, threaded sleeves between the pairs of lugs and engaging the screw bars, sprockets mounted on the sleeves, and a chain engaging the sprockets, whereby the sleeves may all be revolubly actuated in like degree to reciprocate the caps in relation to the body.

12. A drum of the class described comprising a cylindrical body, slotted lugs disposed in pairs on the ends of the body extending radially centerward of the body, end caps extending over the ends of the body and slidable over the peripheral surface of the body, flanges on the caps extending radially outward from the opposed ends of the caps, screw bars mounted on the caps disposed in substantial parallelism with the axis of the drum and extending reciprocally thru the slots in the lugs, threaded sleeves between the pairs of lugs and engaging the screw bars, a crank shaft extending between the ends of the body, sprockets mounted on the sleeves and on the crank shaft, and a chain extending about the sprockets adapted to impart rotatory motion of the crank shaft to the sleeves.

13. A curling board and mounting for dough molders having drums comprising a curling board, a pivotal mounting for the board, means yieldingly resisting movement of the board about its pivotal mounting and means for adjustably positioning the curling board in relation to the drum.

14. A curling board and mounting for dough molders comprising a curling board, an arm capable of rotatory adjustment about its mounting, a pivot connecting the arm and the curling board, and means yieldingly resisting movement of the board upon the pivot.

15. A curling board and mounting for dough molders comprising a pivotally mounted curling board, a stem pivotally engaging the curling board, a pivot supporting the stem, a support for the pivot, a flange on the support, a pin mounted on the stem adapted to engage the flange, a spring mounted on the pin abutting the flange and the stem, and means limiting the movement of the stem from the flange.

16. In a curling board and mounting for dough molders the combination of a pivotally mounted curling board, a support, arms on the support, a flange on the support, a rock shaft carried by the arms, a stem mounted on the rock shaft pivotally engaging the curling board, a bracket mounted on the stem, a screw mounted on the bracket adapted to engage the flange, a spring on the screw abutting the flange and the bracket, and means limiting the relative movement of the bracket and the flange.

17. In a dough molder the combination of a curling board, a flapper pivotally mounted on the curling board, and means yieldingly holding the flapper in the path of a band of dough moving toward the curling board.

18. In a dough molder the combination of a curling board, lugs extending from the board, a shaft extending between the lugs, a flapper pivotally mounted on the shaft, and means yieldingly resisting movement of the flapper on the shaft.

19. In a dough molder the combination of a curling board, lugs extending from the board, a shaft extending between the lugs, a flapper pivotally mounted on the shaft, means yieldingly resisting movement of the flapper on the shaft, and means limiting the movement of the flapper under the influence of the yielding means.

20. In a dough molder the combination of a curling board, lugs extending from the board, a shaft extending between the lugs, a flapper pivotally mounted on the shaft, a spring mounted on the shaft having one of its ends secured upon the shaft and having its other end extending over the flapper, and pins extending from the lugs and against which the spring yieldingly retains the flapper.

21. The combination with a dough molder having a drum on the face of which dough is carried while passing therethru, of rotatable means to adjustably vary the area of the face of the drum, whereby batches of dough of various sizes may be passed thru the molder.

22. In a dough molder the combination of a drum, end caps telescopically adjustable over the ends of the drum whereby various portions of the surface of the drum may be exposed, rotatable means for effecting such adjustment, means to deposit a film of flour over the exposed portion of the drum, and means to render the flour depositing means inoperative.

23. In a dough molder the combination of a drum, a flouring device comprising a flour drum, a pair of depending pipes pivotally mounted upon said flour drum and communicating with the interior thereof, and means connecting the pipes for effecting convergence and divergence of said depending pipes above the first mentioned drum.

24. In a dough molder the combination of a drum for carrying a band of dough, flanges on the drum, a flour container mounted above the drum, and controllable means for directing flour from the container to the flanges on the drum.

In testimony whereof, I have hereunto subscribed my name this 10th day of February, 1922.

WILLIAM G. KIRCHHOFF.